(12) United States Patent
Lüst

(10) Patent No.: US 7,040,365 B2
(45) Date of Patent: May 9, 2006

(54) BAND DEVICE FOR A WHEEL RIM

(75) Inventor: Richard David Lüst, Melchbourne (GB)

(73) Assignee: Tyron Automotive Group Limited, Bedford (GB)

( * ) Notice: Subject to any disclaimer, the term of this patent is extended or adjusted under 35 U.S.C. 154(b) by 0 days.

(21) Appl. No.: 10/276,235

(22) PCT Filed: May 16, 2001

(86) PCT No.: PCT/GB01/02150

§ 371 (c)(1),
(2), (4) Date: Mar. 31, 2003

(87) PCT Pub. No.: WO01/87646

PCT Pub. Date: Nov. 22, 2001

(65) Prior Publication Data

US 2003/0160501 A1     Aug. 28, 2003

(30) Foreign Application Priority Data

May 16, 2000  (GB) .................................. 0011727

(51) Int. Cl.
*B60B 21/02* (2006.01)
*B60C 17/00* (2006.01)

(52) U.S. Cl. .................................... 152/381.5; 152/516
(58) Field of Classification Search ............. 152/381.5, 152/516, 520, 381.4, 381.6, 375, 379.4, 400
See application file for complete search history.

(56) References Cited

U.S. PATENT DOCUMENTS

| | | | | |
|---|---|---|---|---|
| 4,122,882 A | * | 10/1978 | Fisher et al. | 152/381.5 |
| 4,159,730 A | | 7/1979 | Osada et al. | |
| 4,346,747 A | * | 8/1982 | Osada et al. | 152/158 |
| 4,391,317 A | * | 7/1983 | Savage | 152/516 |
| 4,662,419 A | | 5/1987 | Winfield | |
| 4,694,874 A | * | 9/1987 | White | 152/381.5 |
| 4,784,202 A | * | 11/1988 | White | 152/381.5 |
| 4,987,937 A | * | 1/1991 | Nowicke | 152/400 |
| 5,000,241 A | * | 3/1991 | Patecell | 152/382 |
| 5,435,368 A | * | 7/1995 | Lust | 152/381.6 |
| 6,357,833 B1 | * | 3/2002 | Bajer | 301/95.101 |
| 6,698,481 B1 | * | 3/2004 | Marin | 152/381.6 |

FOREIGN PATENT DOCUMENTS

EP          0 404 483         12/1990

* cited by examiner

*Primary Examiner*—Russell D. Stormer
*Assistant Examiner*—Jason R. Bellinger
(74) *Attorney, Agent, or Firm*—Cahill, von Hellens & Glazer, P.L.C.

(57) ABSTRACT

An assembly (10) for location around a wheel rim (32) includes an annular support band (12) being formed of a relatively inextensible material. The support band (12) is split at at least one circumferential location to define a pair of opposed ends (16, 18). Adjustment bolt (24) is operably connected to the opposed ends (16, 18) for enabling adjustment of the diameter of the support band (12), and feet (14) depend from the radially inner face (34) of the support band (12). The feet (14) are formed from a relatively non-compressible material and, in use, are seated upon the wheel rim (32) to maintain the support band (12) in a spaced apart relationship with the wheel rim (32). The assembly may be adapted for use as a runflat assembly or as a beadlock assembly.

20 Claims, 11 Drawing Sheets

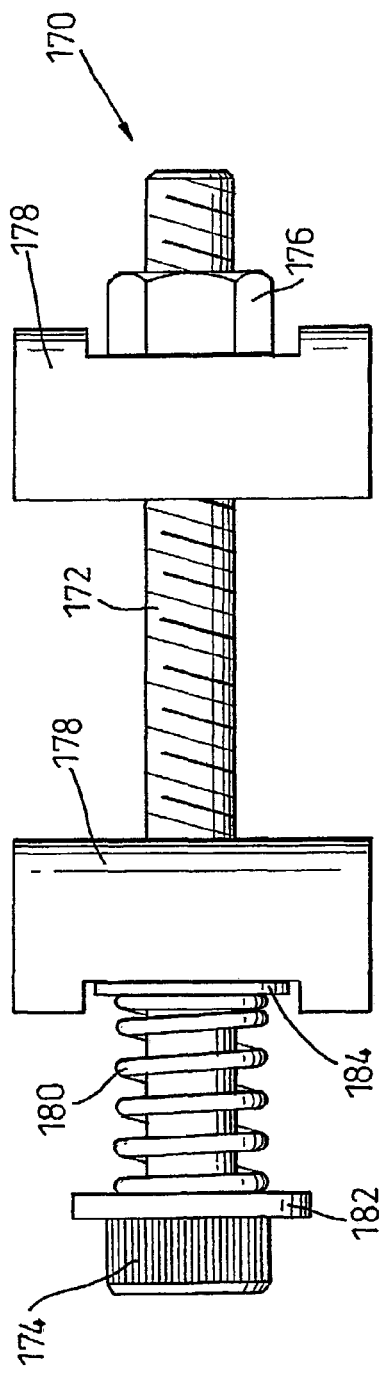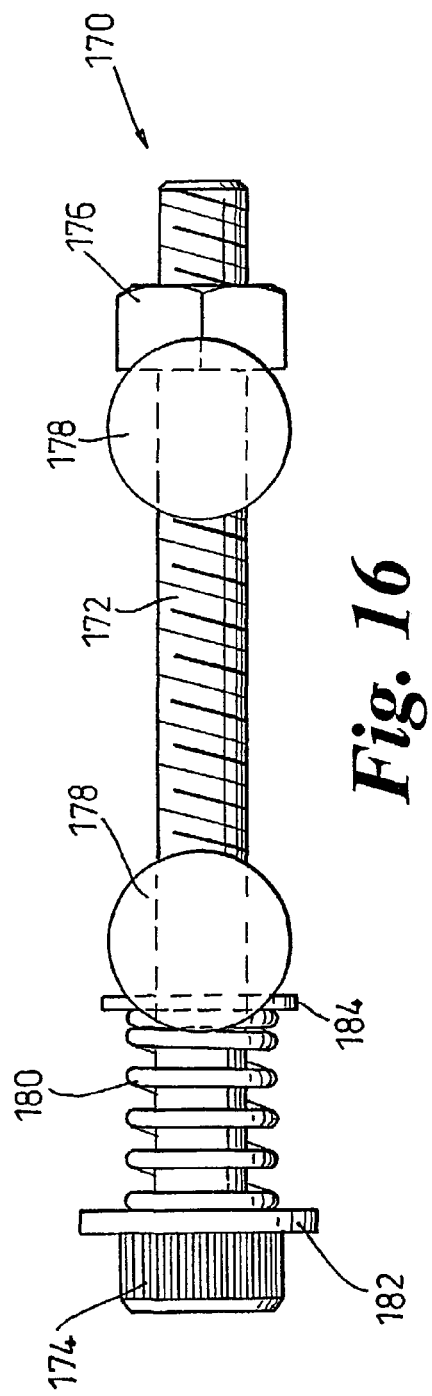
Fig. 15
Fig. 16

BAND DEVICE FOR A WHEEL RIM

This application is a national phase of International Application No. PCT/GB01/02150 filed May 16, 2001 and published in the English language.

TECHNICAL FIELD

The invention relates an assembly for incorporation about a vehicle wheel rim, which is suitable for use as either a runflat assembly or a beadlock assembly, depending on the structure of the wheel rim.

BACKGROUND OF THE INVENTION

A vehicle wheel normally comprises a pneumatic tire supported upon a wheel rim. The wheel rim usually includes a pair of axially spaced apart tire seats against which the beads of the tire are seated in use.

In between the tire seats of a one piece wheel, the wheel rim usually includes a well which, during fitting and removal of the tire, receives the beads of the tire to enable them to be passed over the tire seats.

In the event of a tire puncture, whilst the wheel is rotating (herein referred to as a "runflat operation"), it is possible for the tire, if sufficiently deflated, to come off of the wheel rim due to the tire beads entering the well. If this happens, steerage control of the wheel, and hence the vehicle, is lost.

It is known to provide a runflat assembly which during fitting of a tire on a wheel rim, are fitted to block-off the well and thereby prevent the beads of the tire entering the well.

It is important, once a runflat assembly has been fitted, that it does not become loose within the tire, particularly in the event of the deflation of the tire. Also, when deflation has occurred, it should be sufficiently robust to support the tire beads and prevent them from entering the well or deforming the runflat assembly.

These requirements necessarily mean that the runflat assembly has to be a good fit within the well of the wheel rim.

Unfortunately, there are a large number of different designs/shapes of wheel rims for vehicles, and so usually specific runflat assemblies are tailor made for particular designs of wheel rims.

In addition to the variety of designs/shapes of wheel rims, the materials from which the wheel rims are made can vary also. For example, wheel rims are commonly made from pressed steel or cast from a suitable alloy. This means that the runflat assemblies also have to be tailor made to accommodate the different materials from which the wheel rims are made.

It is not necessary to provide a well between the tire seats of two piece and multipiece wheels, because a tire is fitted to the wheel rim of such a wheel before the components of the wheel are secured together.

Multipiece wheels are primarily used in heavy duty and/or military applications. In such applications there is often a requirement for the vehicle to be run with tires at low pressures in order to obtain extra traction and/or flotation when required, e.g. in sand (military desert applications) or muddy conditions.

These vehicles are often fitted with a Central Tire Inflation System so that the tires can be significantly reduced in pressure and then re-inflated whilst on the move.

When the tires are fully inflated, the beads of the tire are retained in position, against the tire seats, by the pressure of the air within the tire. However, when the tires are run at a low pressure, there is a risk that the tire beads will move inwards, towards one another, across the wheel rim because the air pressure within the tire is not sufficient to retain the tire beads in position.

This creates a similar situation to a blowout, because the tire will instantaneously, and fully, deflate.

When this occurs the Central Tire Inflation System becomes ineffective and the tire cannot be re-inflated without removal from the vehicle.

An additional hazard, especially when the tire is used on sand, mud or water, is that sand/mud/water will get into the tire. This means that the tire must be completely removed from the wheel and cleaned before it is re-fitted and re-inflated.

It is known to provide a beadlock that is fitted around the wheel rim of a multipiece wheel between the beads of a tire and thereby retain the beads of the tyre tire spaced apart from each other, even when air pressure in the tire is reduced.

A beadlock can be fitted to a two piece or multipiece wheel, whereas it cannot be fitted to a single piece wheel provided with a well. This is because the provision of the beadlock would make it impossible to fit a tire to the single piece wheel.

The beadlock is fitted to the wheel so that it is a tight fit between the inner sections of the tire's beads, and it is usually fitted under pressure. The beadlock improves traction in extreme conditions because it helps to prevent the tire from slipping around the wheel under traction, and during braking conditions.

Known beadlocks are positioned between the beads of a tire before the tire is fitted to a two piece or multipiece wheel. They are often made of either a rubber or plastic ring, and are difficult to fit, having to be twisted and/or compressed to be able to be positioned inside a tire. During fitting of the tire, the tire, with a beadlock in position, is put over the wheel rim, and the complete assembly is forced down over the rim using a press.

This means that the beadlock must be tailor made to fit a particular tire and a particular wheel rim. This is because it is not possible to adjust the beadlock once it is fitted to a wheel, with a tire.

SUMMARY OF THE INVENTION

According to a first aspect of the invention an assembly for location around a wheel rim is provided, the assembly comprising an annular support band being formed of a relatively inextensible material and being split at at least one circumferential location to define a pair of opposed ends, adjustment means operably associated with the support band for enabling adjustment of the diameter of the support band, and spacing means depending from the radially inner face of the support band, the spacing means being formed from a relatively tough, load-bearing, non-metallic material which in use is seated upon the wheel rim and maintains the support band in a spaced apart relationship with the wheel rim.

An advantage of the invention is that the assembly can be used with wheel rims that are manufactured from a variety of materials, including wheel rims that are cast from an alloy. This is because the support band formed from a relatively inextensible material, such as steel, is supported in a spaced relationship with the wheel rim by the spacing means. The lack of contact between the support band and the wheel rim prevents corrosion that may otherwise occur as a result of dissimilar metal contact. It also prevents the support band from rubbing against the wheel rim that may create sharp edges on the support band and/or scratch the surface of the wheel rim. The spacing means formed from a relatively tough, load-bearing, non-metallic material is unlikely to scratch the wheel rim and/or cause any corrosion of the wheel rim.

The support band can also be easily modified, using the adjustment means, to fit wheel rims having different circumferential sizes. For example, when the support band is used in a runflat assembly, the support band can be adjusted to fit the wheel rim and prevent the runflat assembly from rotating about the wheel rim.

In a first particular embodiment of the invention, the assembly is adapted for location in a well of a wheel rim.

In this embodiment of the invention, the support band may have an axial width substantially the same as the width of the mouth of a well. The spacing means may also have a shape, in cross-section, which enables it to be seated upon the floor of the well and maintain the support band in a spaced apart relationship with the wheel rim.

The support band of this embodiment of the invention is suitable for use as a runflat assembly.

An advantage of this particular embodiment of the invention is that the runflat assembly can be easily modified to cater for wheel rims having different shaped wells, by exchanging the spacing means for a spacing means having a different cross-sectional shape/size/depth.

For example, the spacing means may be replaced with a relatively deeper spacing means for use in a relatively deeper well.

In a second particular embodiment of the invention, the support band is adapted to resiliently urge the beads of a tire into abutment with the wheel rim.

The support band may have an axial width substantially the same as the width of the wheel rim.

An advantage of this embodiment of the invention is that it is not necessary to use a support band that is tailor made to fit around the wheel rim. This is because the support band can be adjusted using the adjustment means to fit wheel rims having varying circumferential sizes.

It is also advantageous because the split in the support band allows the support band to be flexed into a smaller circumference when the adjustment means are removed. This provides a much simpler, and easy, method of fitting the support band within the tire. It is not necessary to twist and/or compress the support band in order to fit it within the tire.

The support band according to the second embodiment of the invention may include a strip positioned on each of its two outer peripheral edges, the strip being molded from a resilient material.

The strips prevent the support band from cutting into or otherwise damaging the tire. Also, friction between the strips and the beads of the tire assists in holding the tire to the rim, improving traction and improving braking resistance.

They also reduce the risk of water/mud/sand or any other debris from getting into the tire.

The strips may include formations along their outer edges for improving grip between the strips and the tire beads. In particular, the strips may include serrations along their outer edges.

In either of these two embodiments of the invention, the spacing means may include a plurality of feet, wherein each foot is detachably engageable with the support band.

The use of such feet is advantageous because they allow a user to provide a tailored fit easily, and simply, by choosing which feet would be suitable for a particular wheel rim before fitting them to the support band.

This therefore provides the runflat assembly with a certain degree of versatility because the detachably engageable feet allow the runflat assembly to be modified easily to fit wheel rims having wells of different shape, size and depth.

For example, the feet may be replaced with relatively longer feet in order to modify the assembly for use in a relatively deeper well.

Each foot preferably includes at least one indicating means by which a user can determine the cross-sectional shape/size/depth and/or weight of the foot.

This allows a user to quickly, and easily, determine whether a particular foot is suitable for use in a particular wheel rim.

For example, feet that have a cross-sectional shape corresponding to the shape of the well of a first wheel rim may be red, whereas feet that have a cross-sectional shape corresponding to the shape of the well of a second wheel rim may be blue, i.e. the feet may be color coded.

Where the spacing means includes a plurality of feet, then at least one of the feet may be hollow and may include at least one monitoring device and at least one transmitting device. Such monitoring and transmitting devices are known per se.

The use of such a hollow foot, in a runflat/bead lock assembly fitted to a wheel, may allow an onboard computer controlling the function of components about a vehicle to which the wheel is attached, to determine certain parameters concerning the wheel. For example, the monitoring device may monitor the ambient temperature within the well of the wheel rim, inflation pressure of the tire or the rotational speed of the wheel during movement of the vehicle.

The use of such a hollow foot is advantageous when it is used in a runflat assembly because it houses the monitoring and transmitting devices within the well of the wheel rim, below the support band. This means that during fitting of a tire on the wheel the support band protects the monitoring and transmitting devices.

In further embodiments the annular support band may include a plurality of apertures that are spaced about, and extend between opposing faces of, the support band. Each foot may then be detachably engaged with the support band by detachably engaging at least a portion of the foot in one of the apertures.

The use of such apertures allows a user to determine the number, and location, of feet that are provided around the assembly. This means that a user can, to a certain extent, control the overall weight of the assembly. It also allows the user to balance the weight of the assembly. For example, feet having different weight may be provided at different positions around the support band in order to balance the weight of the support band. This simplifies the balancing of the wheel after a tire has been fitted, because it reduces balancing of the wheel that may otherwise be required as a result of the use of the assembly.

It also allows a user to easily engage or disengage each foot with the support band as required. It thereby reduces the risk of any feet becoming disengaged whilst the assembly is fitted, and whilst it is in use. It also allows a user to replace a foot easily if it should become damaged, rather than having to replace the entire assembly.

The apertures themselves are also advantageous because they reduce the overall weight of the support band, without reducing its effective surface area. They thus reduce the overall weight of the assembly without effecting its function in, for example, a runflat operation.

When the support band is used in a runflat assembly, the apertures in the support band may be offset in relation to the center of the band to take account of wheel rims having off-center wells.

Engaging a portion of each foot in an aperture in the support band is advantageous because it means that the transmitting portion of a transmitting device housed in a hollow foot, may be positioned in the engaging portion of the hollow foot. This ensures that the transmitting portion is not shielded by the support band, so allowing the transmitting device to communicate with any receivers or transmitters that are positioned externally of the wheel.

Each of the plurality of apertures is preferably circular in shape and each foot preferably includes an engaging portion that is cylindrical in shape and is detachably engageable within one of the circular apertures. The engaging portion of each foot may include a rounded free end that in use protrudes through a respective circular aperture.

The use of engaging portions having rounded free ends is advantageous because it provides the runflat assembly with a substantially smooth radially outer surface, substantially free from any edges, when the feet are detachably engaged with the support band.

A bridge may be fitted across any apertures in the opposed ends of the support band through which the adjustment means may be inserted and adjusted. Such a bridge member may in use extend across the gap between the opposed ends and may include a terry clip to secure it in position in the apertures with respect to the support band. The bridge member presents a substantially smooth radially outer surface and helps to ensure that the radially outer surface of the support band has a smooth surface.

The provision of a smooth radially outer surface of the support band means that an inner tube used within a tire fitted to the wheel is less likely to become damaged. This is because there are no edges that may otherwise damage the tube, or impede the tire during inflation. Also, the location of the rounded ends of the engaging portions in the apertures of the support band prevents the tube from being forced through any of the apertures during inflation of the inner tube.

In some embodiments of the invention, the support band may be split at two, equally spaced apart, circumferential locations. This allows further adjustment of the circumference of the support band.

In other embodiments of the invention, each of the opposed ends of the support band may include a curved lip portion. Such curved lip portions increase the strength and prevent bending of the ends of the band if fixings are overtightened, or stressed, for example, during a runflat operation. In situations wherein the support band is overtightened, the annular support band is pulled tighter into the well of the wheel rim. In a severe overtightening situation, the adjusting means between opposed ends of the band breaks before the curved lip portions become completely "unfurled" and thereby damaged so that it could be dangerous in use without the user being aware.

Each of the curved lip portions may include an ancillary spacer means formed from a plastics material in the form of a button or limb that depends from the radially inner surface of the lip portion, at its free end. The use of such ancillary spacer means is advantageous because in use they may lie in contact with the floor of the well of a wheel rim when used in a runflat assembly, or in contact with the wheel rim when used in a beadlock. The ancillary spacer means thus provide extra support at the opposed ends, where it may not be possible to fit any of the spacing means mentioned previously, and thereby ensure that the support band remains in a spaced apart relationship with the wheel rim, particularly during a runflat operation. The ancillary spacer means prevent the support band from contacting the well of the wheel rim, and thus compliment the effect of the spacer means formed from a relatively tough, load-bearing, non-metallic material, preventing metal to metal contact, corrosion and scratching.

The ancillary spacer means are fitted to the free ends of the curved lip portions to ensure that they do not interfere with the adjustment means.

The ancillary spacer means are preferably detachable to allow modification of the assembly to fit wheel rims having wells of different shape, size and/or depth.

For example, the ancillary spacer means may be changed for relatively longer or shorter ancillary spacer means when the assembly is used in a relatively deeper or shallower well in a wheel rim.

The adjustment means in some embodiments of the invention may be spring biased. The use of such spring biasing is particularly advantageous when the support band is fitted as a beadlock. This is because the spring biasing means that it is not necessary to pre-fit the support band round the wheel rim before fitting it within the tire.

According to a second aspect of the invention there is provided an assembly for location around a wheel rim comprising an annular support band being formed of a relatively inextensible material and being split at at least one circumferential location to define a pair of opposed ends, adjustment means operably associated with the support band for enabling adjustment of the diameter of the support band, and spacing means depending from the radially inner face of the support band, the spacing means being formed from a plurality of feet detachably engageable with the support band.

BRIEF DESCRIPTION OF THE DRAWINGS

Preferred embodiments of the invention will now be described, by way of non-limiting examples, with reference to the accompanying drawings in which:

FIGS. 15 and 16 show an adjustment means in accordance with an embodiment of the invention.

DETAILED DESCRIPTION OF THE INVENTION

Figure 1:
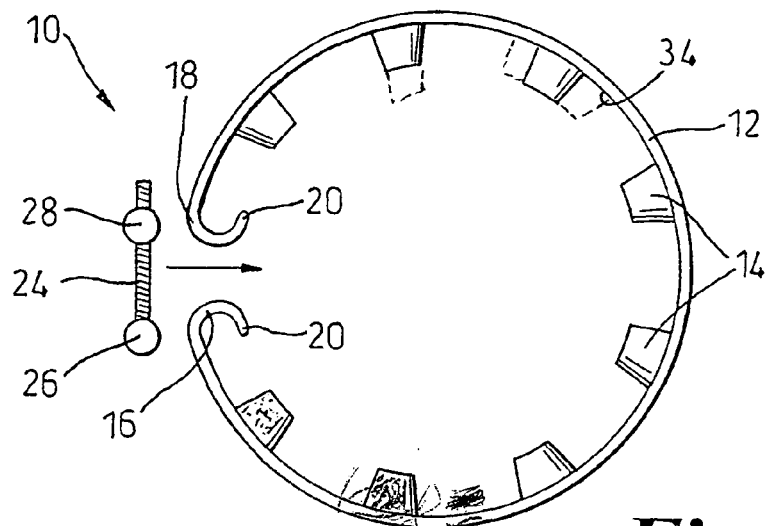
FIGS. 1 and 2 show an assembly in accordance with in embodiment of the invention.
Figure 2:
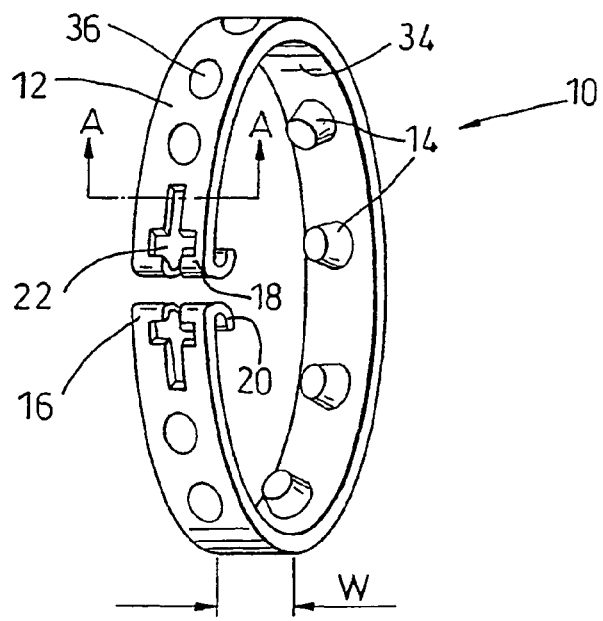

A runflat assembly 10 according to an embodiment of the invention is shown in FIGS. 1 and 2.

The runflat assembly 10 includes a support band 12 formed from a relatively inextensible material, such as steel, and a plurality of feet 14 formed from a relatively tough, load-bearing, non-metallic material, such as high density polyethylene or glass-filled nylon.

The support band 12 is split at one point about its circumference, forming two opposed ends 16, 18 of the support band 12. Each of the opposed ends 16, 18 includes a curved lip portion 20 that curves inwardly, towards the center of the support band 12.

As well as a curved lip portion 20, each of the opposed ends 16, 18 also includes a cross-shaped aperture 22 (FIG. 2), and the opposed ends 16, 18 are operably connected to each other by inserting an adjustment bolt 24 through the respective apertures 22 in the opposed ends 16, 18.

The adjustment bolt 24 is screw threaded, and is provided with a bolt head 26 at one end, and a worm gear mechanism 28 at the other end. The worm gear mechanism 28 provides means by which the operable length of the bolt 24 can be adjusted in order to adjust the circumference of the support band 12, as will be described later.

The axial width W of the support band 12 substantially corresponds to the width of the mouth of a well 30 in a wheel rim 32 (FIG. 3) about which the runflat assembly 10 is to be fitted.

The plurality of feet 14 depend, at spaced apart locations, from the radially inner face 34 of the support band 12. The specific location and identity of the feet 14 about the circumference of the support band 12 may be determined by the weight of each of the feet 14, in order to balance the weight of the runflat assembly 10 about the wheel rim 32 to which it is to be fitted.

As shown in FIG. 2, the support band 12 includes a plurality of circular shaped apertures 36 spaced apart about its circumference.

The apertures 36 may be offset from the center of the support band 12 to take account of wheel rims having off-center positioned wells.

Figure 4A:
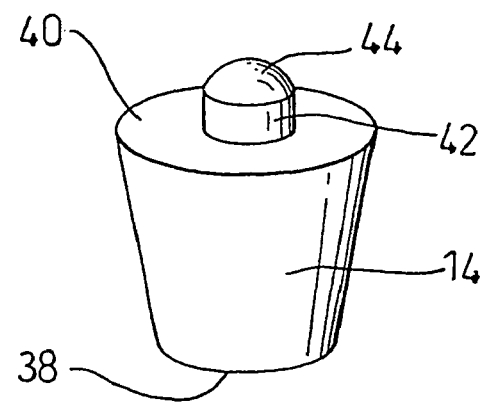
FIGS. 4a and 4b show a spacing means in accordance with an embodiment of the invention.

As shown in FIG. 4a, each foot 14 is frustoconical in shape and includes first and second opposing flat surfaces 38, 40. The first, relatively smaller, flat surface 38 acts as a base and, in use, rests on the floor of a well 30 in a wheel rim 32.

A cylindrical engaging portion 42 projects from the second, relatively larger, flat surface 40. The diameter of the engaging portion 42 corresponds to the diameter of each of the apertures 36 in the support band 12.

The engaging portion 42 of each foot 14 is detachably engaged in a respective aperture 36 in the support band 12 in a push fit manner. This allows, for example, each foot 14 to be replaced by a relatively longer or shorter foot 14 in the event that the assembly 10 is to be used in a relatively deeper or shallower well.

Figure 4B:
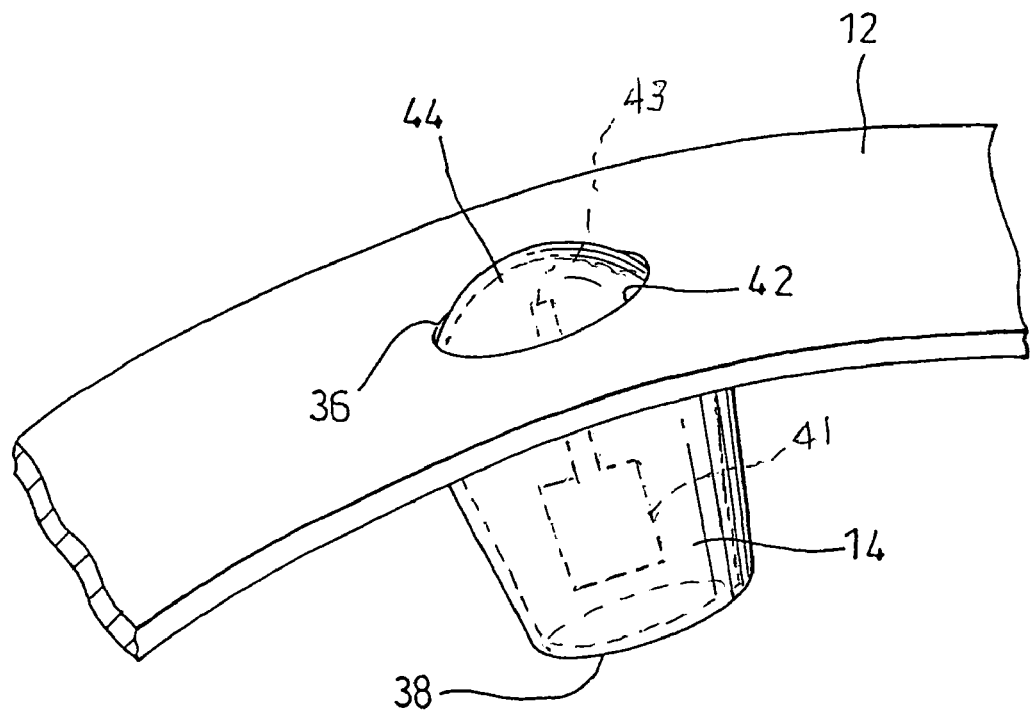

The free end 44 of the engaging portion 42 that protrudes through a respective aperture 36 in the support band 12 is rounded so that the radially outer surface of the support band 12 is substantially free of any edges, as shown in FIG. 4b.

Figure 3:
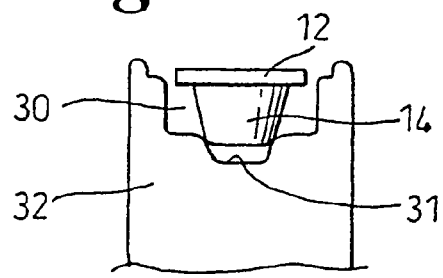
FIG. 3 shows the assembly of FIG. 2 along the line A—A when it is fitted to a wheel rim.

When the runflat assembly 10 is fitted around the wheel rim 32 of a wheel, the support band 12 is positioned so that it extends around the wheel rim 32 in the mouth of the well 30, as shown in FIG. 3. The operable length of the bolt 24 is adjusted so that the support band 12 is tightened about the wheel rim 32, preventing the runflat assembly 10 from rotating about the circumference of the wheel rim 32.

Tightening of the support band 12 about the wheel rim 32 forces the feet 14 tighter against the wheel rim 32 so that they become seated on the floor 31 of the well 30.

When the support band 12 is tightened sufficiently, the feet 14 support the support band 12 in a spaced relationship with the wheel rim 32.

This ensures that the support band 12 does not lie in contact with the wheel rim 32. It also ensures that the support band 12 is retained in the correct position so that in the event of a runflat operation, the support band 12 prevents the beads of a pneumatic tire fitted about the wheel rim 32, from entering the well 30.

The material from which the feet 14 are formed prevents them from becoming squashed within the well 30, and ensures that the feet 14 support the support band 12 correctly.

In other embodiments of the invention, at least one of the feet 14 may be hollow and contain at least one monitoring device and at least one transmitting device.

The use of a hollow foot 14 allows any monitoring and transmitting devices 41 (FIG. 4b) to be housed, in use, below the support band 12, in the well 30 of the wheel rim 32. This means that during fitting of a tire to the wheel, the devices are protected by the support band 12, and are not damaged by forcing the beads of the tire across the radially outer surface of the support band 12.

Figure 19:
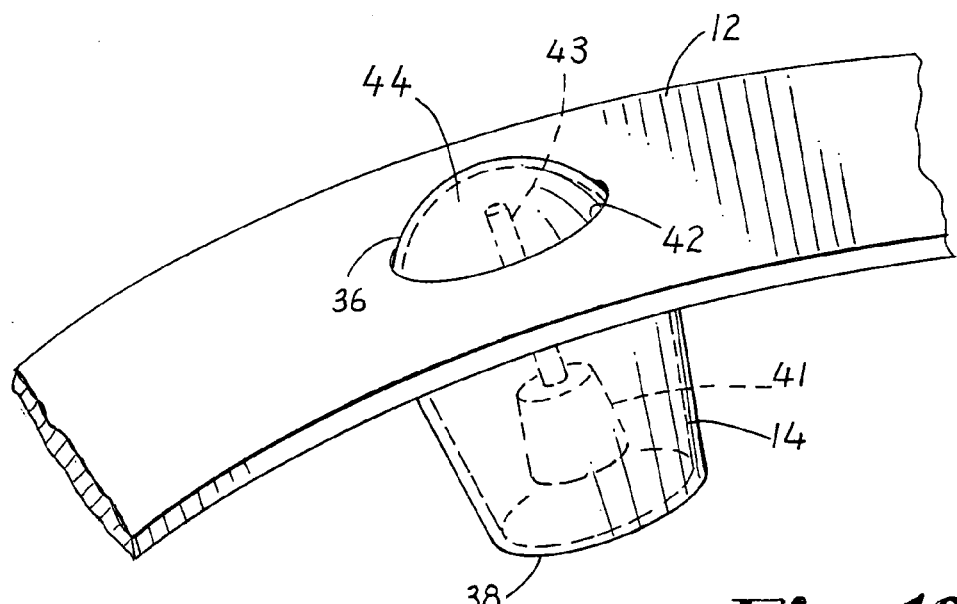
FIG. 19 shows a spacing means, or foot containing monitoring and transmitting devices.

The transmitting portion 43 (FIG. 19) of any transmitting device may be positioned within the cylindrical engaging portion 42 of the hollow foot 14. This means that the transmitting portion remains protected by the hollow foot 14, during fitting of a tire. However, it also advantageously means that the steel support band 12 does not shield the transmitting portion, and so the transmitting device is able to communicate with any transmitters and receivers located externally of the well in the wheel rim 32.

Figure 17:
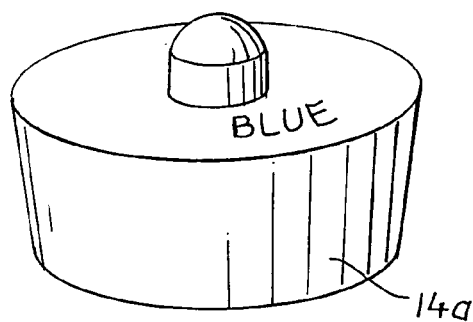
FIGS. 17 and 18 show different size feet bearing different indicia for use in the assembly of this invention.
Figure 18:
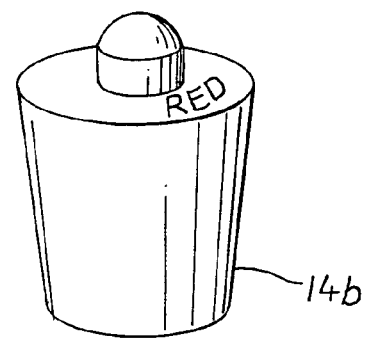

In yet further embodiments of the invention each foot includes at least one indicating means. Such indicating means differentiate between feet having different cross-sectional shape, size and/or depth. For example feet having a first cross-sectional shape may be a different color to feet having a second cross-sectional shape and so on as shown on foot 14a in FIG. 17 and foot 14b in FIG. 18. The indicating means may also differentiate between feet having different weight that may be used when balancing the weight of the runflat assembly.

This may have advantages in fitting centers because the center may have an array of support bands having different axial widths and an array of different but identifiable feet. A fitter can then easily determine which feet he must use in combination with a particular axial width of support band for a runflat assembly to be fitted to a particular wheel rim.

Figure 5:
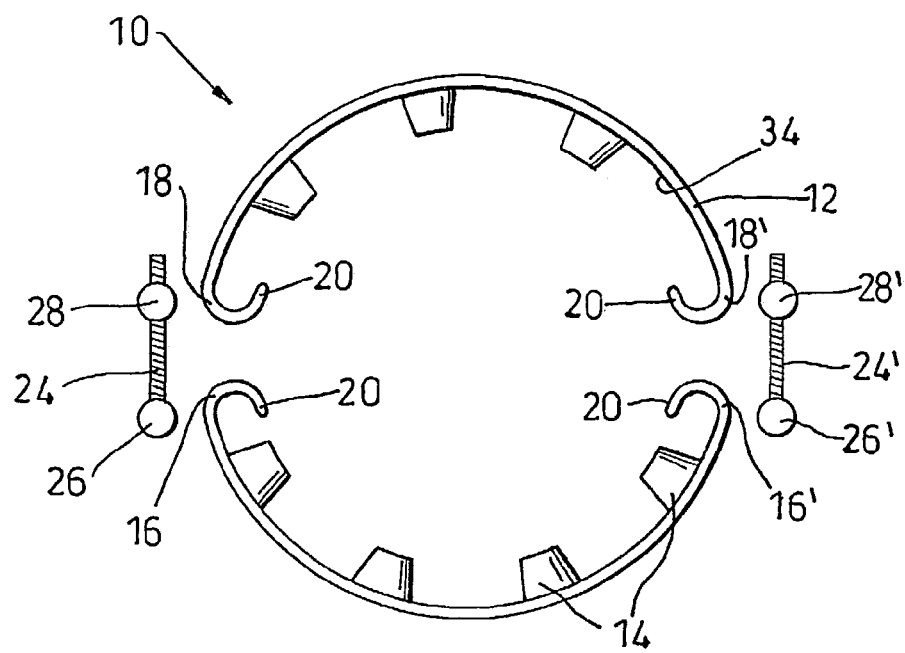
FIG. 5 shows an assembly according to a further embodiment of the invention.

A runflat assembly 10 according to a further embodiment of the invention is shown in FIG. 5.

Once again the runflat assembly 10 includes an annular support band 12 and a plurality of feet 14 depending from the radially inner face 34 of the support band 12. However, the support band 12 according to this embodiment of the invention is split twice at equally spaced apart circumferential locations.

The support band 12 according to this embodiment of the invention therefore includes two sets of opposed ends 16, 18; 16', 18'. The opposed ends 16, 18; 16', 18' of each set are operably connected to each other by a bolt 24, 24'.

As in the previous embodiment, each bolt 24, 24' is threaded and is provided with a bolt head 26, 26' at one end, and a worm gear mechanism 28, 28' at the other end.

The operable length of each bolt 24, 24' is adjustable using the respective worm gear mechanism 28, 28' to allow the circumferential size of the support band 12 to be adjusted so as to obtain a suitable fit about the wheel rim 32 of a wheel.

In this embodiment, and in the previous embodiment, the opposed ends 16, 18 of the support band 12 include curved lip portions 20. The curved lip portions 20 curve inwardly, towards the center of the support band 12.

Figure 6A:
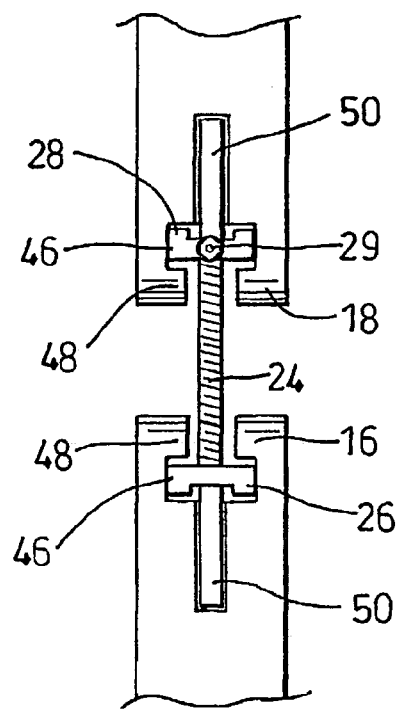
FIGS. 6a–6c show partial views of the assembly of FIG. 5.

Each opposed end 16, 18 includes a cross-shaped aperture 22 as shown in FIG. 6a. Each cross-shaped aperture 22 includes a cross portion 46 that extends across the width of the support band 12, and first and second leg portions 48, 50 that extend from opposing sides of the cross portion 46, along the length of the support band 12.

The cross-shaped apertures 22 of the opposed ends 16, 18 form a mirror image of each other when viewed from the side, (FIG. 6a), so that the first leg portions 48 of the two apertures 22 extend towards one another, away from their respective cross portions 46.

When the support band 12 is positioned about a wheel rim 32, the bolt 24 is inserted into position by passing it lengthwise through the apertures 22 of the opposed ends 16, 18.

Two cylindrical retainer members are slidably mounted on the bolt 24 between the bolt head 26 and the worm gear mechanism 28. When the bolt 24 is inserted through the apertures 22 in the opposed ends 16, 18 of the support band, one of the retainers is positioned on the bolt 24 adjacent to the bolt head 26, and the other retainer is positioned adjacent to the worm gear mechanism 28.

The bolt head 26 and its corresponding retainer member pass through the cross portion 46 of one of the apertures 22 in one of the opposed ends 16 whilst the worm gear mechanism 24 and its corresponding retainer member pass through the cross portion 46 of the aperture 22 in the other opposed end 18. The bolt 24 passes through the first and second leg portions 48, 50 as required.

The worm gear mechanism 28 includes a standard hexagonal bolt head arrangement 29. This bolt head arrangement 29 allows a user to tighten the support band 12 about the wheel rim 32 directly from the side of the wheel. The bolt head arrangement 29 allows the user to use a normal socket/socket set and torque wrench.

The operable length of the bolt 24, between the bolt head 26 and the worm gear mechanism 28 is adjusted by turning the hexagonal bolt head of the hexagonal bolt head arrangement 29. This forces the worm gear mechanism along the bolt 24 either towards or away from the bolt head 26 depending on the direction in which the hexagonal bolt head is turned.

The bolt head arrangement 29 faces outwards through the relevant aperture 22 allowing easy access to the bolt head arrangement 29. This arrangement is advantageous over commonly known bolt arrangements used to adjust the operable length of the bolt in which a round headed Allen key is often required to turn the bolt i.e. by inserting an end of the Allen key into an aperture in the bolt head. The arrangement makes fitting of the runflat assembly much more simple, fast and an easy one-man operation.

When the bolt 24 is inserted through the apertures 22 in opposed ends 16, 18 of the support band, the worm gear mechanism 28 must be positioned on the bolt 24 so that the operable length of the bolt, between the retainer members associated with the bolt head 26 and the worm gear mechanism 28, corresponds to the distance between the cross portions 46 of the apertures 22.

Figure 6B:
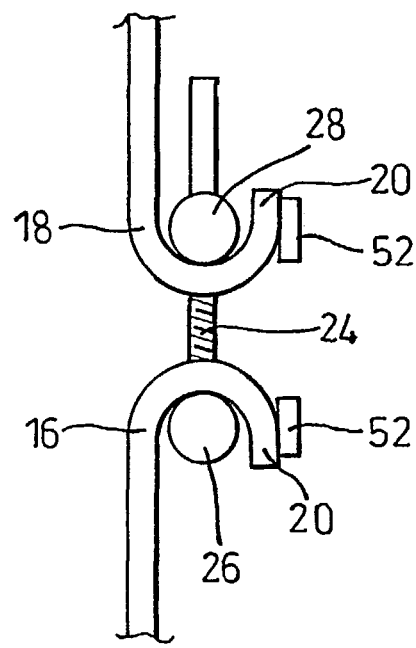

In use, adjustment of the operable length of the bolt 24 to tighten the support band 12 about the wheel rim 32 causes the bolt head 26 and the worm gear mechanism 28, and their corresponding retainer members, to be drawn against the inner surface of the respective curved portion 20 of the opposed ends 16, 18. This is shown in FIG. 6b.

This means that the bolt head 26 and the worm gear mechanism 28 are retained between the respective first leg portions 48 of the apertures 22 and the respective curved portions 20 of the opposed ends 16, 18. This prevents them from passing back through the cross portions 46 of the apertures 22.

In an overtightening situation, the bolt 24 continues to be tightened even when the support band 12 is tight against the wheel rim 32. This forces the curved portions of known support bands to unfurl as a result, causing the bolt to be forced against the end of the leg portion of each of the apertures. This may cause the curved portions to unfurl completely, possibly breaking, and it may also strain the curved portions so weakening them.

Figure 6C:
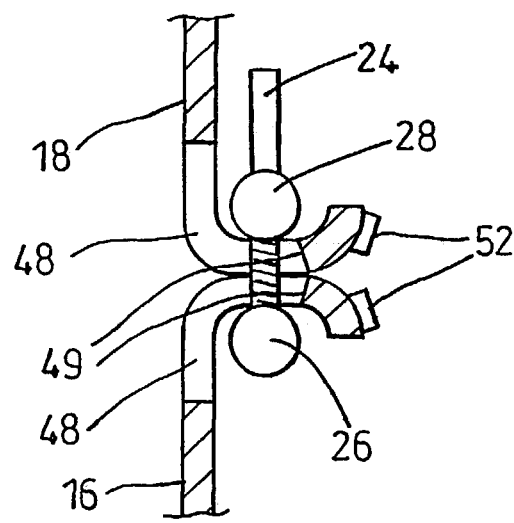

The length of the curved portion 20 of each opposed end 16, 18 is such that if the bolt 24 is overtightened, so forcing the opposed ends 16, 18 closer together when the support band 12 is tight against the wheel rim 32, then the curved ends 20 do not unfurl completely before they abut against each other, as shown in cross-section in FIG. 6c.

When the opposed ends 16, 18 are abutted against each other they prevent each other from unfurling any further in response to further adjustment of the operable length of the bolt 24.

Also the first leg portion 48 of each aperture 22 extends along the length of the curved portion 20 so that if the bolt 24 is tightened so that the opposed ends 16, 18 abut each other then the bolt 24 is not forced against the ends 49 of the first leg portions 48, as shown in FIG. 6c. This prevents weakening of the curved portions 20. Further adjustment of the bolt 24, after the opposed ends 16, 18 have abutted each other, therefore causes strain in the bolt 24 rather than in the curved portions 20.

In embodiments wherein the support band 12 is split at two circumferential locations, the length of each of the bolts 24, 24' can be half that of a bolt 24 used in a support band 12 that is only split once, and continue to provide the same amount of adjustment. This is advantageous because it means that as the worm gear mechanisms 28, 28' progress along the length of the bolts 24, 24' then the free end of each of the bolts 24, 24' does not protrude into the support band 12 as may occur when a longer bolt 24 is used in a support band 12 that is only split once.

In embodiments of the invention, the radially inner surface of each of the curved lip portions 20 of the opposed ends 16, 18 may be provided with an ancillary spacer means in the form of a button 52 formed from a plastics material (FIGS. 6b and 6c). The button 52 is secured to the free end of each of the curved lip portion 20 so preventing the button 52 from interfering with the bolt head 26 and the worm gear mechanism 28 of the adjustment bolt 24.

When the runflat assembly 10 is fitted to a wheel rim, the buttons 52 provided on the radially inner surfaces of the curved lip portions 20 engage the floor 31 of the well 30 of the wheel rim 32. They thus support the opposed ends 16, 18 of the support band 12 in the spaced apart relationship with the wheel rim 32, particularly in a runflat operation.

The ancillary spacer means are preferably detachable and in other embodiments may take the form of elongate limb members. For example, the buttons 52 may be replaced with limb members to modify the assembly 10 for use in a relatively deeper well.

Figure 7:
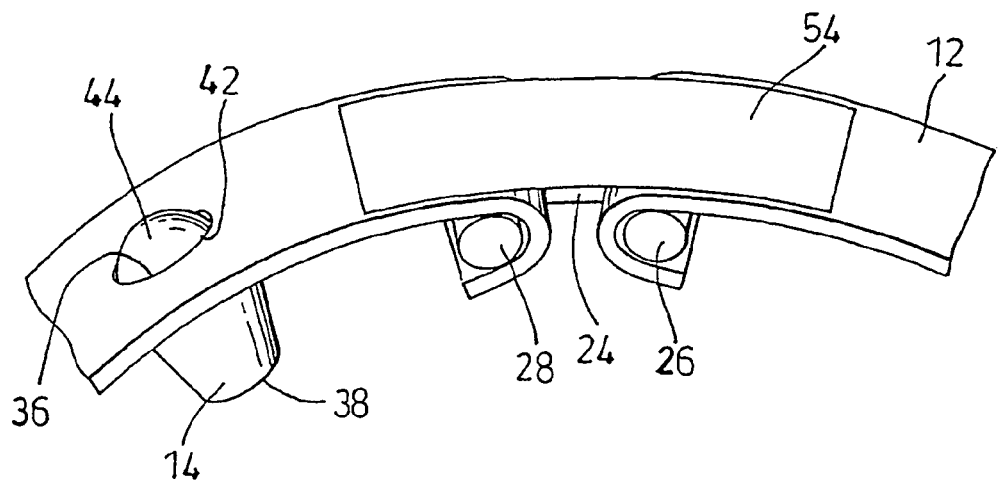
FIG. 7 shows a bridge in accordance with an embodiment of the invention.

When adjustment of the bolt 24 has been completed, a bridge 54 may be secured across the gap between the opposed ends 16, 18, as shown in FIG. 7. The bridge 54 includes a terry clip that engages the apertures 22 in the opposed ends 18, 16 to secure the bridge 54 in position. When fitted, the bridge 54, together with the projecting rounded free end 44 of the cylindrical engaging portion 42 of each of the feet 14 detachably engaged within the apertures 36, presents a smooth surface to ensure that the radially outer surface of the support band 12 is smooth and substantially free from any edges.

In other embodiments of the invention the bolt 24 may be replaced by a conventional bolt arrangement in which a threaded bolt having a bolt head is passed through an aperture in each of two cylindrical retainer members, and into a threaded nut, such as a Nylock nut.

The operable length of the bolt according to such embodiments is adjusted by inserting an Allen key into the bolt head and turning it so as to turn the threaded bolt either into or out of the nut positioned at the other end of the bolt.

As with the bolt 24 described in relation to the previous embodiments, the conventional bolt is passed through the apertures 22 in the opposed ends 16, 18 of the support band 12 so that when the operable length of the bolt is adjusted, each of the retainer members are forced into, and retained within, the relevant curved lip portion of the opposed ends 16, 18.

In other embodiments, the operable length of a threaded bolt may be adjusted by fixing a sprocket, similar to a standard timing belt pulley, to the threaded bolt between the corresponding retainer members of a bolt head and a nut provided at opposing ends of the bolt. A single piece of belt that includes a plurality of equidistantly spaced teeth may be provided around the sprocket so that the teeth on the belt engage between teeth on the sprocket.

The belt may be a single long piece of timing belt, and the distance between the teeth on the belt may correspond to the distance between the teeth on the sprocket.

The operable length of the bolt may then be adjusted by pulling the belt so that the teeth on the belt force the sprocket. Depending on which end of the belt is pulled, the belt and sprocket combination causes the bolt, fixed within an aperture through the center of the sprocket, to be turned into, or out of, the nut.

The nut may be a Nylock nut, and the sprocket may be fixed at a central point along the length of the threaded bolt, or may be formed as part of the threaded bolt.

This arrangement allows adjustment of the operable length of the bolt without having to insert an Allen key into the bolt head. It also allows the support band to be adjusted as far away from the wheel, and thus as far away from the restrictions of the tire, as the length of the belt will allow.

In yet further embodiments, a jubilee type clip may be used as an adjustment means to adjust the circumferential size of the support band 12. However, whereas standard jubilee hose clips include tooth threads extending perpendicular to the longitudinal axis of the band, the jubilee type clip according to such embodiments of the invention have tooth threads that extend at an acute angle to the longitudinal axis of the band, preferably at an angle of about 45°, and the corresponding worm gear drive mechanism on the clip band is set at an angle with respect to the clip band.

In such embodiments the curved lip portions of the support band 12 may not be necessary because the clip band may be positioned around a wheel, over the top of the support band 12.

The worm gear mechanism is fixed to a first end of the clip band, and is engageable with the other end of the clip band. When the worm gear mechanism is engaged with the other end of the clip band, it may be moved along the length of the clip band, so as to adjust the circumferential size of the clip band, by turning an adjustment screw on the worm gear mechanism. This forces the mechanism to draw itself along the clip band by engaging the tooth threads in the clip band.

By adjusting the circumferential size of the clip band when it is in position over the top of a support band around a wheel, the clip band may be pulled tight over the support band. This forces the feet into position on the wheel rim, and retains the support band in position.

The clip band is preferably positioned around a wheel rim, over the top of the support band, so that the tooth threads are positioned on the radially inner surface of the clip band. This means that when the worm gear mechanism is engaged with the other end of the clip band, the worm gear mechanism is located on the radially inner side of the clip band, preferably within a slot or recess formed in the support band 12. This ensures that a substantially smooth surface may be maintained over the radially outer surface of the assembly.

Access to the adjustment screw on the worm gear mechanism may be provided on the side of the clip band because the tooth threads are at an acute angle to the longitudinal axis of the clip band 45°. Thus the longitudinal axis of the adjustment screw is also at an acute angle to the longitudinal axis of the band and therefore allows a suitable long screwdriver or other tool to be used to tighten the support band 12 with relative ease, outside the confines of the tire.

Figure 8:
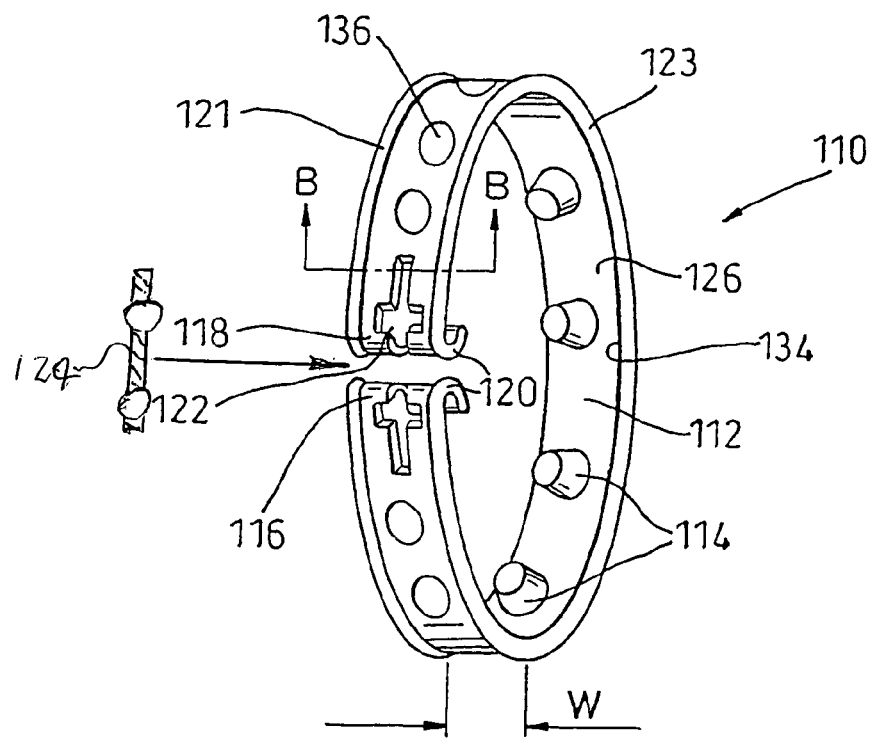
FIG. 8 shows an assembly in accordance with a yet further embodiment of the invention.

A beadlock 110 according to an embodiment of the invention is shown in FIG. 8. The beadlock 110 shown in FIG. 8 is substantially the same as the runflat assembly 10 shown in FIG. 2.

The beadlock 110 includes an annular support band 112 formed from a relatively inextensible material, such as steel, and a plurality of feet 114 depending from the radially inner face 126 of the support band 112. The feet 114 are formed from a relatively tough and load-bearing, non-metallic material such as high density polyethylene or glass-filled nylon.

The support band 112 is split at one point about its circumference, forming two opposed ends 116, 118 of the support band 112. Each of the opposed ends 116, 118 includes a curved lip portion 120 that curves inwardly, towards the center of the support band 112.

As well as a curved lip portion 120, each of the opposed ends 116, 118 also includes a cross-shaped aperture 122, and the opposed ends 116, 118 are operably connected to each other by inserting an adjustment bolt 124 (FIG. 8) through the respective apertures 122 in the opposed ends 116, 118.

The adjustment bolt 124 is substantially similar to the bolt 24 described in respect of the previous embodiments. It is screw threaded, and is provided with a bolt head at one end, and a worm gear mechanism at the other end. The worm gear mechanism provides means by which the operable length of the bolt 124 can be adjusted in order to adjust the circumference of the support band 112, in a similar manner to that described earlier with reference to FIGS. 6a–6c.

As described in relation to the previous embodiments, the circumferential size of the support band 112 may be adjusted by using a conventional bolt arrangement, a bolt including a belt and sprocket arrangement or a jubilee clip type arrangement, rather than with the bolt and worm gear arrangement.

Figure 9:
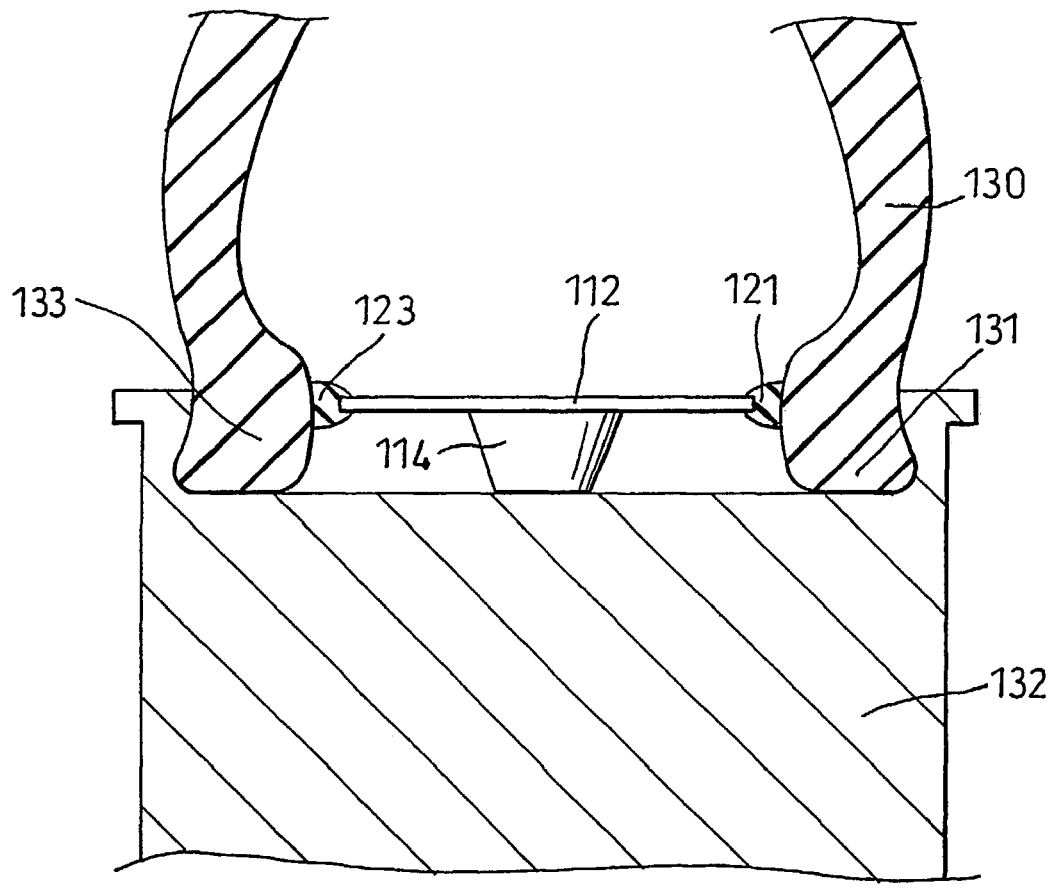
FIG. 9 shows the assembly of FIG. 8 along the line B—B when it is fitted to a wheel rim.

The axial width W of the support band 112 substantially corresponds to the width of the wheel rim 132 (FIG. 9) about which the beadlock is to be fitted between the beads 131, 133 of a tire 130.

As in the runflat assembly described with reference to FIGS. 1 and 2, the plurality of feet 114 depend, at spaced locations, from the radially inner face 134 of the support band 112.

The feet 114 are fitted within a plurality of circular apertures 136 provided in the support band 112. The apertures 136 are spaced around the circumference of, and extend between opposing faces of, the support band 112.

The feet 114 are similar to the feet 14 described earlier with reference to FIGS. 4a and 4b. As shown in FIGS. 4a and 4b, each of the feet 114 is frustoconical in shape, and is provided with an engaging portion that push fittingly engages within an aperture 136.

The support band 112 of the beadlock 110 further includes two molded rubber strips 121, 123 fitted to its peripheral edges.

The beadlock assembly 110 is initially pre-fitted around the circumference of the wheel rim 132 to which a tire 130 is to be fitted. The operable length of the bolt 124 is adjusted to provide a suitable fit around the wheel rim 132, so that the feet 114 are seated on the wheel rim. It is not necessary for the feet 114 to fit tight against the wheel rim 132, because in use, the tire 130 holds the beadlock 110 in position, and prevents the beadlock from rotating about the wheel rim 132.

When the operable length of the bolt 124 has been adjusted so that the circumference of the support band 112 provides a suitable fit around the wheel rim 132, the support band 112 is removed from the wheel rim 132, without further adjustment of the operable length of the bolt 124.

The material from which the support band 112 is made means that it is possible to flex the opposed ends 116, 118 of the support band 112 towards one another. This allows the bolt head and the worm gear mechanism of the bolt 124 to move so that they can be passed through the cross-shaped apertures 122 in the opposed ends 116, 118 of the support band 112.

When the bolt 124 has been removed from the support band 112, the support band 112 can be flexed further to reduce its circumference by overlapping the opposed ends 116, 118. This allows the support band 112 to be inserted through the circular opening on one side of the tire. However, before the support band 112 retains its original circumferential size, the bolt head and worm gear mechanism of the bolt 124 are reinserted through the cross-shaped apertures 122 in the opposed ends 116, 118. This allows the support band 112 to flex back to the circumferential size that it was adjusted to during the pre-fitting step.

The beadlock 110 is retained tightly between the beads 131, 133 of the tire 130, and the tire and beadlock 110 are then placed over the wheel rim 132 in the normal manner i.e. by using a press.

When the tire 130 is fitted to the wheel rim 132, the feet 114 engage against the surface of the wheel rim 132, ensuring that the support band 112 maintains a spaced relationship with the wheel rim 132. They provide sufficient slippage to allow the beadlock 110 within the tire 130 to be fitted to the wheel rim 132. However, they prevent the support band 112 from scratching the wheel rim, and prevent any corrosion that may otherwise be caused by dissimilar metal contact.

As in previously described embodiments, at least one of the feet 114 may be hollow, and may contain at least one monitoring device and at least one transmitting device.

Also, the feet 114 may include at least one indicating means to differentiate between feet 114 having different cross-sectional shape, size, depth and/or weight, as described in the previous embodiments.

The molded rubber strips 121, 123 around the peripheral edges of the support band 112 prevent the support band 112 from damaging the tire beads 131, 133.

Figure 10:
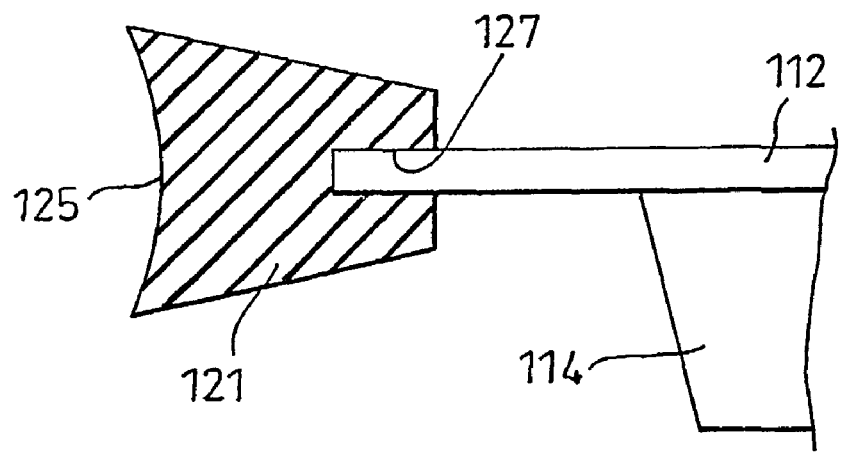
FIGS. 10 and 11 show partial views of alternative arrangements of the assembly of FIG. 8.
Figure 11:
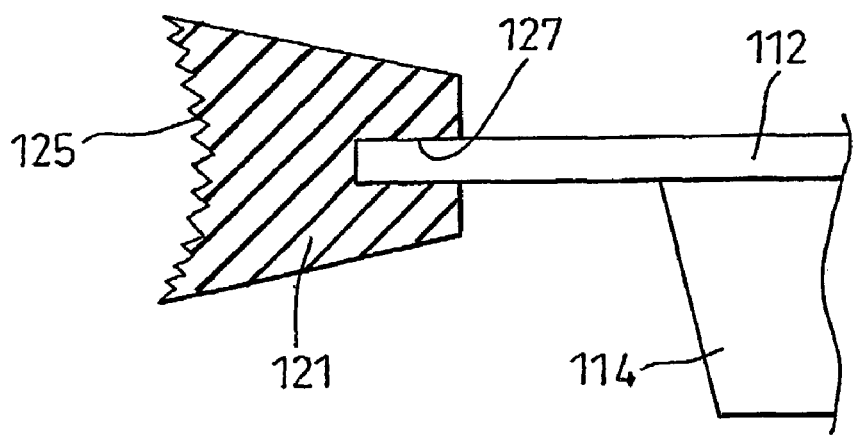

Each of the molded rubber strips 121, 123 includes an outer edge 125 (FIGS. 10 and 11) that, in use, engages, via friction, with an inner portion of one of the tire beads 131, 133. The outer edge 125 may be formed substantially flat, as shown in FIG. 10. Alternatively, it may be formed with a plurality of serrations, as shown in FIG. 11.

In embodiments wherein the outer edge 125 of each of the molded rubber strips 121, 123 is formed with a plurality of serrations, then the outer edge 125 may be shaped to provide a perfect fit on the respective tire bead 131, 133.

In other embodiments, the outer edge 125 of each of the strips 121, 123 may be shaped so that it has a slightly smaller radius. In use, the beads 131, 133 of a tire automatically put pressure on the respective molded rubber strips 121, 123 when the strips 121, 123 push against the beads 131, 133. This squeezes the slots 127 into which the support band 112 is fitted in each of the strips 121, 123, assisting the strips 121, 123 to grip their respective peripheral edge of the support band 112.

Tooling for producing the strip may be adjustable to allow the slot 127 in each of the strips 121, 123 to be adjusted. Such adjustments can then be made to take account of depth adjustment and small variations in wheel and/or tire bead widths. It thereby allows the pressure applied by the beadlock 110 to beads 131, 133 of a tire 130 to be adjusted.

The support band 112 may be split at two equally spaced apart circumferential locations, as described previously with reference to FIG. 5.

Figure 12:
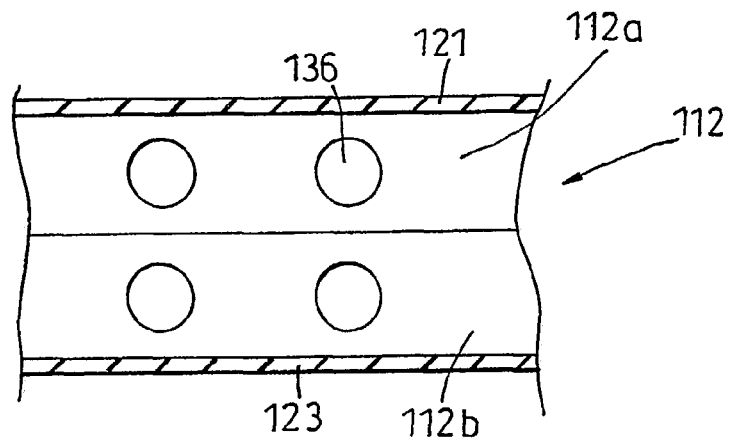
FIG. 12 shows a support band in accordance with an embodiment of the invention.

In other embodiments of the invention, the support band 112 of the beadlock 110 may include two support bands 112a, 112b welded together along their adjacent edges, as shown in FIG. 12.

In such an embodiment of the invention, each of the support bands 112a, 112b may include a series of apertures 136 so that two side by side rows of feet 114 (not shown) may be provided along the length of the support band 112.

The provision of two side by side rows of feet 114 depending from the radially inner face of a support band 112 provides extra stability, particularly when the beadlock is used on a relatively wide wheel rim 132.

The support band of the runflat assembly 10 described earlier with reference to FIGS. 1 and 2, may be modified in a similar manner, so as to provide two rows of feet 114 and provide extra support and stability when the runflat assembly is located in a relatively wider well of a wheel rim.

Figure 13:
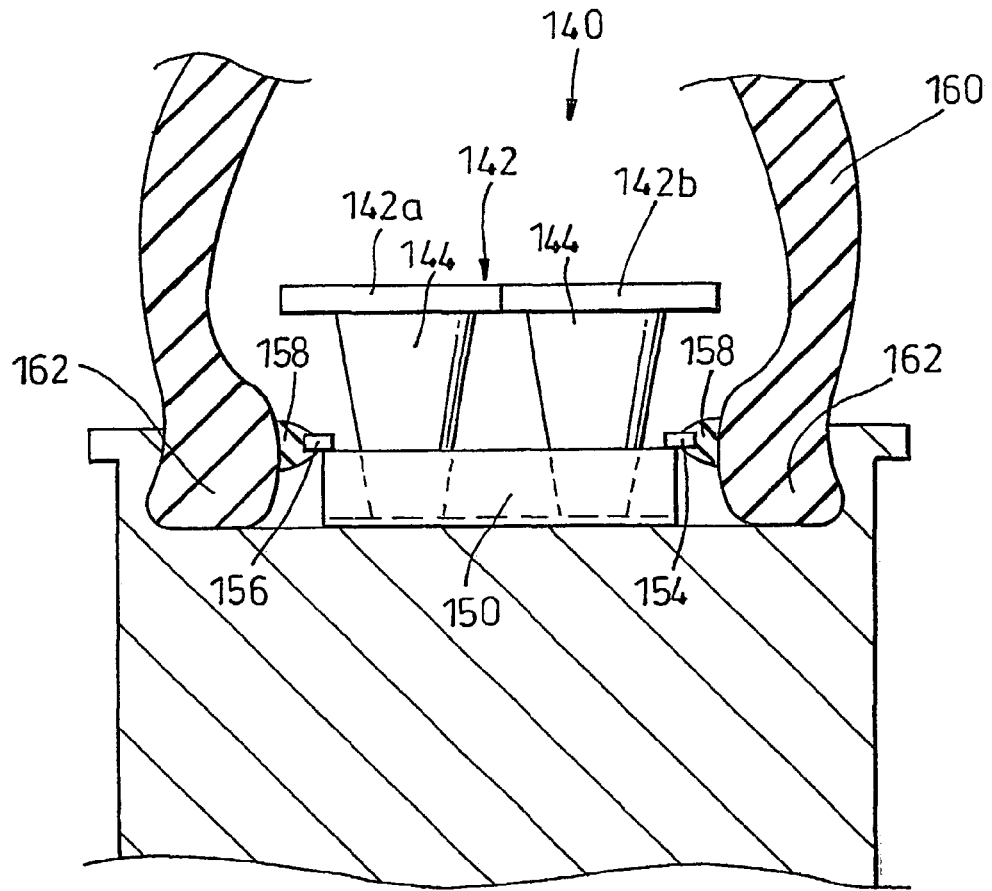
FIGS. 13 and 14 show an assembly in accordance with another embodiment of the invention.
Figure 14:
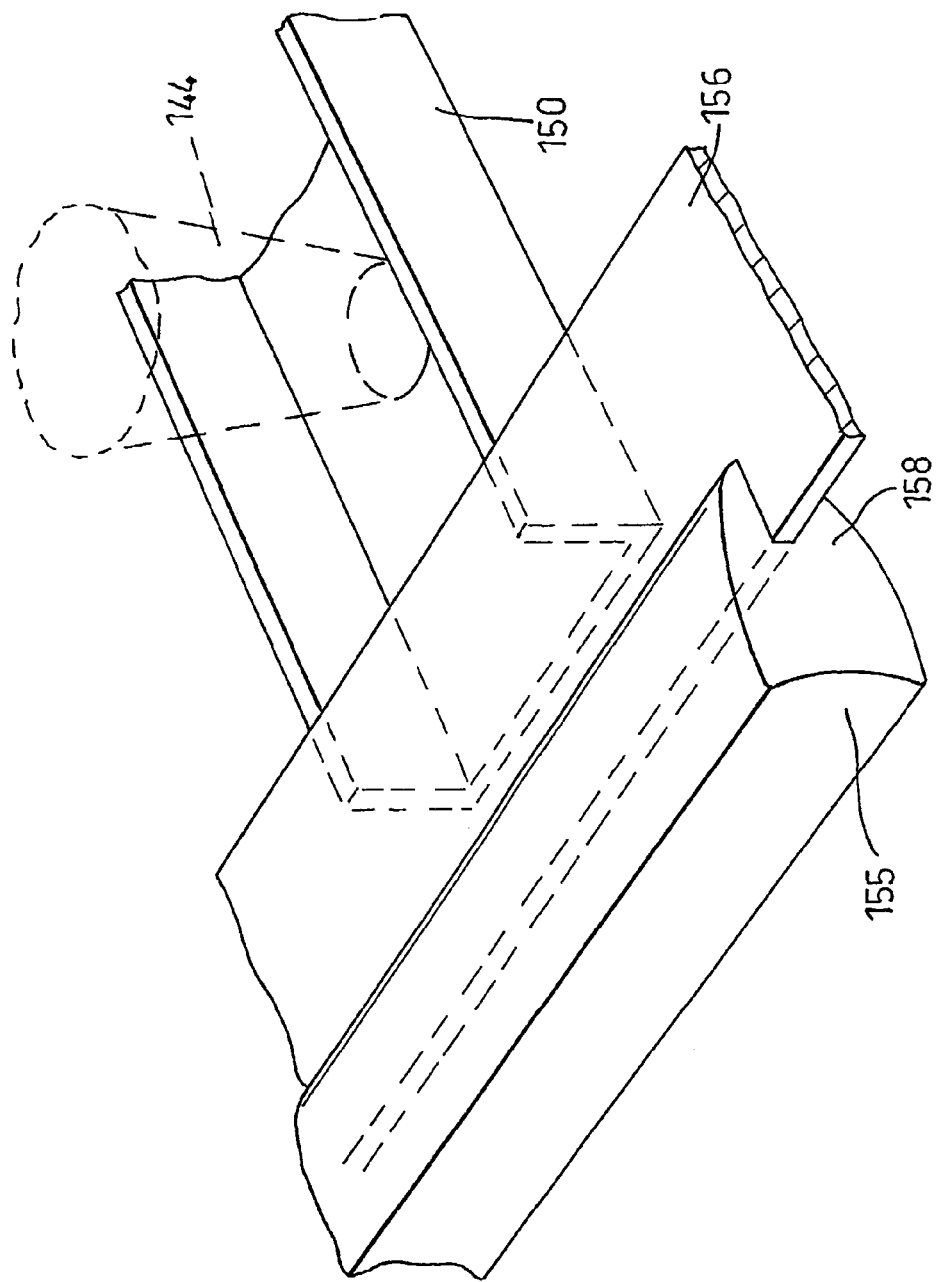

As shown in FIGS. 13 and 14, runflat assemblies 140 in which the support band 142 comprises two bands 142a, 142b secured together side by side along their adjacent edges, e.g. by welding, can be modified for use as a beadlock. This is done by securing an elongate channel member 150 across each pair of side by side feet 144, as shown in FIG. 14.

Each elongate channel member 150 is substantially C-shaped in cross-section, and is open along one side, as shown in FIG. 14. It is preferably formed from a lightweight material to ensure that the overall weight of the assembly is not greatly increased.

Each elongate channel member 150 is positioned so that the free ends of two side by side feet 144 pass through the open side of the channel member 150, and are seated on an inner surface of a base portion of the channel member 150.

Two steel strips 154, 156 may be mounted cross the ends of the channel members 150 positioned over the pairs of side by side feet 144, so that they extend parallel to the length of the support band 142.

Each of the steel strips 154, 156 is substantially the same depth as the support band 142, and is provided along one peripheral edge with a molded rubber strip 158. The molded rubber strip 158 is substantially the same as the molded rubber strips 121, 123 described earlier, and can be formed with either a substantially flat engaging face 155, or a serrated engaging face, as described with reference to FIGS. 10 and 11.

When the runflat assembly 140 modified in this way is used as a beadlock, the assembly is located within a tire 160 so that the rubber strips 158 engage the beads 162 of the tire, and retain the assembly 140 in position in the tire 160, as shown in FIG. 13.

An adjustment member 170 according to an embodiment of the invention is shown in FIGS. 15 and 16.

The adjustment member 170 comprises an elongate threaded bolt 172 provided with a bolt head 174 at one of its ends. A standard lock nut 176 is screwed onto the threads of the bolt 172 at its other end.

Both the lock nut 176 and the bolt head 174 include a cylindrical retainer member, or roller, 178 in combination therewith. The operable length of the threaded bolt 172 extends between the rollers 178.

The adjustment member 170 can be used in any of the previously described runflat and beadlock embodiments to adjust the circumference of the support band 12, in a similar manner to that described with reference to FIGS. 6a–6c. In such use, the roller 178 portions of the lock nut 176 and of the bolt head 174 are drawn against curved lip portions of the support band to prevent disengagement of the adjustment member 170 from the support band.

The adjustment member 170 shown in FIGS. 15 and 16 includes a coiled spring 180 located between the bolt head 174 and its associated roller 178.

The coiled spring 180 ensures that the bolt head 174 and its associated roller 178 are maintained a predetermined distance apart from each other. Washers 182, 184 are provided at each end of the coiled spring 180 to provide surfaces against which the spring 180 can engage.

The spring 180 allows the operable length of the bolt 172, between the rollers 178, to be temporarily increased without moving the lock nut 176. This is because the roller 178 associated with the bolt head 174 can be moved, against the bias of the spring 180, towards the bolt head 174, so increasing the operable length of the bolt 172.

When the sprung biased roller 178 is released, the spring 180 forces it back into its normal position, a predetermined distance away from the bolt head 174, so returning the operable length of the bolt 172 to its previous size.

This is particularly advantageous when used in a beadlock because it allows the operable length of the bolt 172 to be temporarily increased during fitting of the adjustment means to the support and located within a tire.

In other embodiments of the invention, the support band may be provided with a strip on its radially outer surface that is formed from a resilient material. The strip may be a relatively thick rubber strip that is bonded to the radially outer surface of the support band.

The use of such a strip on the radially outer surface of the support band is particularly advantageous during a runflat in an off-road situation. This is because it would provide some shock absorption.

The tire rubber compatible grease may be used, inside the tire, to reduce the temperature that is created as a result of friction between the strip on the support band the tire.

What is claimed is:

1. An assembly for location around a wheel rim comprising an annular support band being formed of a relatively inextensible material and being split at at least one circumferential location to define a pair of opposed ends, adjustment means operably associated with the support band for enabling adjustment of the diameter of the support band, said support band being adapted to selectively receive a plurality of feet formed from a load bearing, non-metallic material, to form a spacing means depending from the radially inner face of the support band which in use is seated upon the wheel rim and maintains the support band in a spaced apart relationship with the wheel rim, the feet being detachably engageable with the support band, and selected from a plurality of different shapes and/or sizes to permit tailoring of the spacing means to fit the wheel rim.

2. An assembly as claimed in claim 1 adapted for location in a well of the wheel rim.

3. An assembly as claimed in claim 2 wherein the support band has an axial width substantially the same as the width of the mouth of the well and each of the feet forming the spacing means has a shape, in cross-section, which enables it to be seated upon the floor of the well and, together with the other feet, maintain the support band in a spaced apart relationship with the wheel rim.

4. An assembly as claimed in claim 1 adapted to resiliently urge the beads of a tire into abutment with the wheel rim.

5. An assembly as claimed in claim 4 wherein the support band has an axial width substantially the same as the width of the wheel rim.

6. An assembly as claimed in claim 5 wherein the support band includes a strip positioned on each of its two outer peripheral edges, the strip being molded from a resilient material.

7. An assembly as claimed in claim 6 wherein each of the molded strips includes formations along its outer edges for improving grip between the strips and the beads of the tire.

8. An assembly as claimed in claim 7 wherein each of the molded strips includes serrations along its outer edges.

9. An assembly as claimed in claim 1 wherein each foot includes at least one indicating means by which a user can determine the cross-sectional shape/size/depth and/or weight of the foot.

10. An assembly as claimed in claim 9 wherein at least one of said plurality of feet is hollow and includes at least one monitoring device and at least one transmitting device.

11. An assembly as claimed in claim 1 wherein the support band is adapted to receive said feet by the provision of a plurality of apertures that are spaced about, and extend between opposing faces of, the support band.

12. An assembly as claimed in claim 11 wherein at least a portion of each foot is detachably engageable within one of the apertures in the support band.

13. An assembly as claimed in claim 10 wherein the transmitting portion of the at least one transmitting device is located in the portion of the hollow foot that is detachably engageable within one of the apertures in the support band.

14. An assembly as claimed in claim 11 wherein each of the plurality of apertures is circular in shape, and each foot includes an engaging portion that is cylindrical in shape and detachably engageable within one of the apertures.

15. An assembly as claimed in claim 14 wherein the engaging portion includes a rounded free end that in use protrudes through the respective aperture.

16. An assembly as claimed in claim 1 wherein the support band is split at two, equally spaced apart, circumferential locations.

17. An assembly as claimed in claim 1 wherein each of the opposed ends of the support band includes a curved lip portion.

18. An assembly as claimed in claim 17 wherein each of the curved lip portions includes an ancillary spacer means formed from a plastics material depending from the radially inner surface of the lip portion at its free end.

19. An assembly as claimed in claim 1 wherein the adjustment means is spring biased.

20. A kit of parts for forming a tailor-made runflat or bead lock assembly for location around a wheel rim comprising an annular support band formed of a relatively inextensible material and split at at least one circumferential location to define a pair of opposed ends, and adjustment means for tightening the band, the kit further including a plurality of feet of different shapes and/or sizes formed from a load-bearing, non-metallic material and separable from said support band, wherein said support band is adapted to selectively receive one or more of the feet.

* * * * *